INVENTOR.
CHARLES M. WHEELER
HIS ATTORNEY

United States Patent Office
3,488,836
Patented Jan. 13, 1970

3,488,836
METHOD OF MAKING STATORS FOR DYNAMO-ELECTRIC MACHINES OF THE PERMANENT MAGNET TYPE
Charles M. Wheeler, Erie, Pa., assignor to General Electric Company, a corporation of New York
Filed Oct. 4, 1965, Ser. No. 492,720
Int. Cl. H02k 15/00
U.S. Cl. 29—596   8 Claims

ABSTRACT OF THE DISCLOSURE

A stator for a dynamoelectric machine of the permanent magnet type comprises a ring of permanent magnets separated by field poles, with radially directed ends of the field poles in the ring being exposed both at the outer periphery of the stator and at the stator bore. The stator is manufactured in accordance with the method taught in the specification, with magnetizing device and a temporary and removable magnetic flux path using the exposed ends of the field poles to magnetize the permanent magnets and keep them magnetized, respectively, until sometime after the magnetizing device is removed, say when a rotor is installed in the stator.

---

Figure 1:
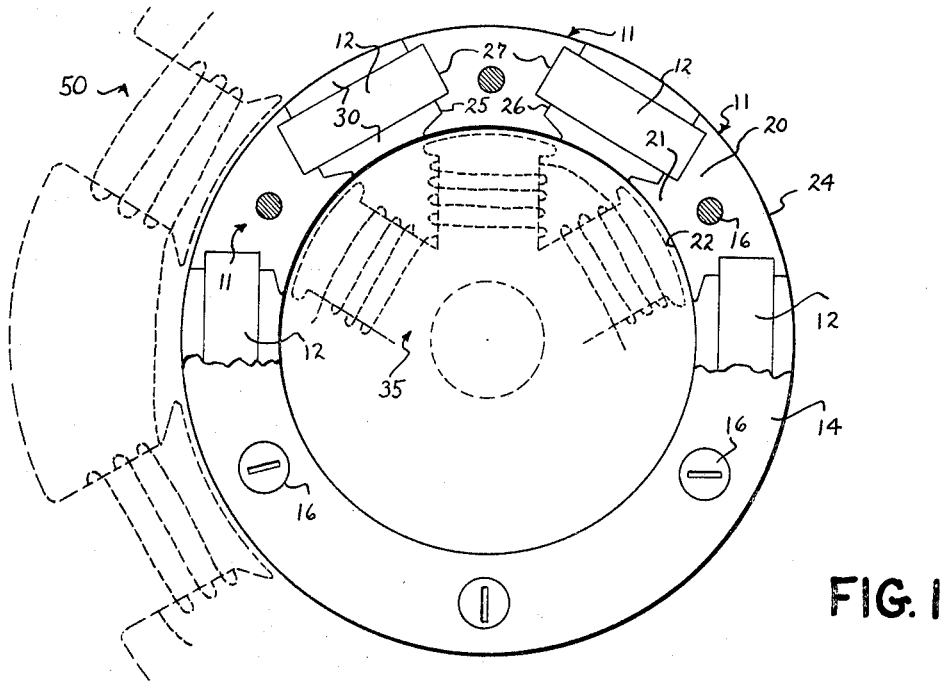

This invention relates to dynamoelectric machines of the permanent magnet type and more particularly to stator for such machines and to a method of making such stators.

As is well known in the art, the construction of the larger permanent magnet type dynamoelectric machines requires that consideration be given to the coercive forces inherent in the large size magnets required and also to the degree of magnetization required for producing the magnetic flux necessary to produce the desired performance. For example, one of the properties of presently available magnet material, such as magnetic alloys of iron, nickel and aluminum, and cobalt or chrome steels, is that upon removal of the equipment providing magnetization, the magnet loses much of its flux if not retained in a magnetic circuit, and the amount of flux capable of being provided by the magnet thereafter, decreases considerably. Accordingly, it has been the practice, especially for the larger machines, to construct the stator with initially unmagnetized magnet elements and thereafter magnetize the magnet elements in place.

One widely used prior art construction arranged the field poles and initially unmagnetized magnet elements in alternate relationship within an outer housing of nonmagnetic material such as aluminum, or the like. The magnet elements were thereafter magnetized in place and a suitable keeper ring placed adjacent one axial end of the stator so that the magnetizing device could be removed and the rotor installed when desired.

Since in such construction the keeper ring must thus be applied to an axial end of the stator, many problems are encountered in carrying out the further assembly of the dynamoelectric machine. For example, since in many machines, the brush rigging must be installed on an axial end of the stator, it is often necessary to remove the keeper ring before this can be accomplished which requires that the rotor first be installed. This is very often inconvenient especially for torque motors which are usually integrated directly into the equipment they are to drive. More importantly, however, such construction places inherent and very often undesirable limits on the design of such machines. That is, since "keeper" flux must pass axially along the field poles into the keeper ring, the machine must have a short axial length to avoid saturation of the poles. Accordingly, such prior art machines were required to have a small ratio of length to diameter resulting in the familiar "pancake" configuration.

A prior art arrangement which was free of the foregoing axial length limitation is disclosed in U.S. Patent No. 2,993,134. In that arrangement the field poles and initially unmagnetized magnet elements are arranged alternately within a frame of nonmagnetic material with provision made for exposing the ends of the poles so that they were adapted for contact by a magnetizing device for magnetizing the magnet elements. In order to avoid the serious practical problems in assembling such a machine, however, it was necessary that the magnets be magnetized after the machine was constructed and the rotor installed therein.

Although this latter construction has been entirely satisfactory in a wide variety of cases it is often very desirable, especially from a manufacturing standpoint, to provide for an arrangement which is free of the axial length limitation as well as one which would provide magnetizing flexibility. Moreover for many practical reasons it is desirable to be able to assemble, store and ship complete stator assemblies without rotors installed therein. For example, if the stator is to be shipped to a user wishing to integrate the machine into his own equipment, no end bells or bearings are provided for the machine. Accordingly, the stator-rotor combination must be provided with special clamping means which hold the rotor in place therein in proper spatial relationship. The user then has the not often simple problem of assembling the machine to his equipment before removing the clamping means.

Accordingly, it is an object of this invention to provide a stator and a method of making it which substantially avoids one or more of the prior art difficulties and provides for greater manufacturing and design flexibility than other known constructions.

It is another object of this invention to provide a method of making a stator for a dynamoelectric machine of the permanent magnet type which simplifies not only the construction and magnetization thereof but the assembly and disassembly of the machine utilizing such a stator as well.

Briefly stated, in accordance with one aspect of this invention, a new, improved and simplified stator is provided for dynamoelectric machines of the permanent magnet type together with a method of making such a stator. The stator is so constructed that the radially directed ends of the field poles are exposed. The outer periphery of the stator is defined by one such exposed end with the stator bore being defined by the exposed pole face region of the pole shoe portion at the opposite end of the field pole member.

In carrying out the further steps of the method of this invention a magnetizing device is placed within the stator bore to magnetize the magnet elements in place and, prior to removal of the magnetizing device, bridging the exposed ends of adjacent field poles with a high permeability material to provide a low reluctance magnetic path to allow for easy removal of the magnetizing device and prevent demagnetization of the magnet elements after such removal. Alternatively, the magnetizing device may be positioned about the outer periphery of the stator to magnetize the magnet elements and the high permeability material bridge provided between the pole shoe portions of the field poles. That is, the initially unmagnetized magnet elements are magnetized in place in the stator assembly and then a temporary and removable low reluctance magnetic flux path is established between whichever of the exposed radially directed ends of adjacent field pole members are accessible to prevent demagnetization of the now magnetized magnet elements when the equipment providing the magnetization is removed.

Figure 2:
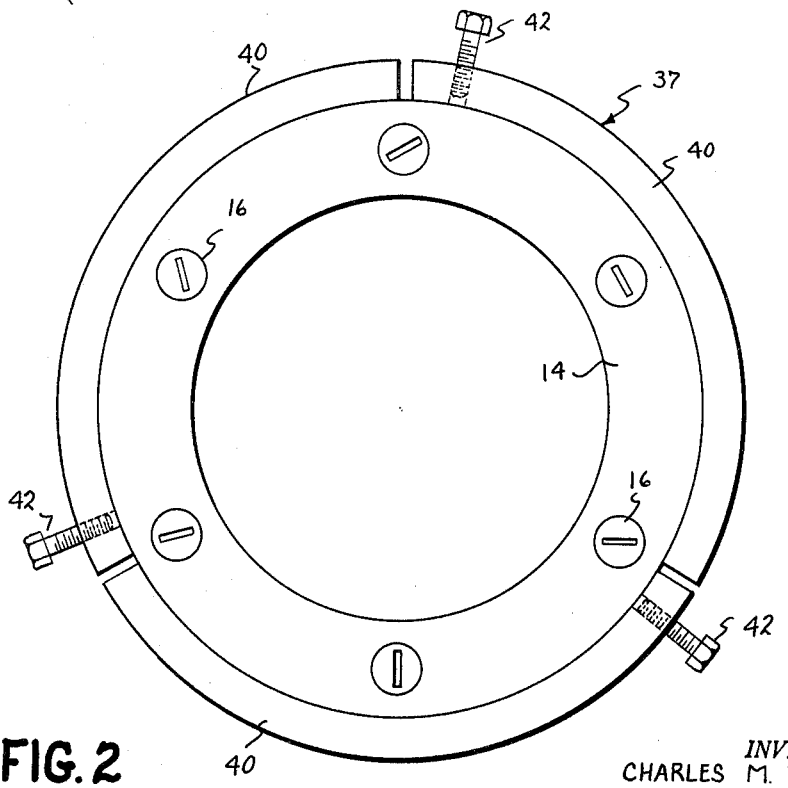

The novel features believed characteristic of the present invention are set forth with particularity in the appended claims. The invention itself, however, together with its organization and method of operation, as well as further objects and advantages thereof, may best be understood by reference to the accompanying drawing wherein:

FIGURE 1 is a view of elevation with parts broken away showing the arrangement of field pole members and permanent magnet elements providing a stator with a magnetizing device shown in phantom in the bore and about the outer periphery of the stator respectively; and FIGURE 2 is a view in elevation showing a stator incorporating the present invention having a ring of high permeability material providing the low reluctance magnetic path disposed adjacent the outer periphery of the stator.

Referring now to FIGURE 1, there is shown a stator, generally designated 10, including a plurality of field pole members 11 and a like plurality of permanent magnet elements 12. Field pole memebrs 11 and permanent magnet elements 12 are rigidly secured together in alternate relationship by a suitable nonmagnetic means to form a ring comprising an annular series of radially disposed, circumferentially spaced field pole members with the permanent magnet elements circumferentially disposed and bridging the space between adjacent field pole members. The nonmagnetic means securing the field pole members together may be a cylinder of nonmagnetic material such as aluminum, brass, nonmagnetic stainless steel or other suitable material which may be cast or otherwise disposed about the field pole members and magnet elements. Preferably, and as shown particularly in FIGURE 1 the field pole members 11 are clamped between a pair of axially spaced circular rings of nonmagnetic material, one of which is shown at 14, such as by the bolts 16 which extend through an opening provided in each field pole member 11 to the other circular ring.

Each of the field pole members 11 includes a pole core portion 20 and a pole shoe portion 21 which terminates in the pole face region 22. Preferably the pole core portion 20 of each of the field pole members 11 is provided with a taper in the direction from its end 24 thereof toward the pole shoe portion 21. Thus, pole core portion 20 has inwardly directed opposite side walls 25 and 26. With the taper so provided on the pole core portion 20, the permanent magnet elements 12 may be of a simple generally rectangular configuration rather than requiring the relatively more costly trapezoidal configuration which would otherwise be required to provide the assembly. The magnet elements, when circumferentially disposed between the adjacent field pole members, as shown, have their ends in intimate contact with the sides of adjacent field pole members 11. Conveniently, the pole core portion 20 of each of the field pole members 11 is provided with a suitable notch, generally indicated at 27, into which the ends of the magnet elements are disposed and are thereby rigidly secured in their proper radial alignment axial movement being restrained by the firm contact of the sides of the magnet elements with the circular end plates or rings 14. Still more rigidity is provided by filling the spaces between the field pole members and the magnet elements with a nonmagnetic material. Preferably the spaces are filled with a suitable thermosetting resinous composition 30 which may be an epoxy resin, for example. After the spaces between the field pole members and the magnet elements are filled with the thermosetting resinous material, the material is cured to bond the field pole members, the magnet elements and the axially spaced circular rings into a rigid unitary assembly.

As shown in FIGURE 1, the radially directed ends 24 of each of the pole core portions 20 of the field pole members 11 are exposed and define the outer periphery of the stator with the inner periphery or bore thereof being defined by the exposed pole face region 22 of the pole shoe portion 21 at the opposite radially directed end of the field pole member.

The new and improved stator and the method of making it just described, therefore, provides for the end 24 of the pole core portion 20 as well as the pole face region 22 of the pole shoe portion 21 of each of the field pole members 11 to be exposed and, therefore, available and adapted for contact by a magnetizing device, to magnetize the magnet elements 12, or adapted for contact by a high permeability material which may be disposed so as to bridge such exposed ends and provide a low reluctance magnetic path to allow for easy removal of the magnetizing device, easy installation and removal of a rotor as well as preventing demagnetization of the magnet elements when the magnetizing device or rotor is removed.

In further carrying out the method of the present invention a suitable magnetizing device, shown in phantom at 35, is placed within the bore of the stator and operated therein in well known manner to magnetize the initially unmagnetized magnet elements 12 previously disposed between the field pole members 11. Such magnetizing devices and the techniques of their operation are so well known in the art that no further description thereof is believed to be necessary for a complete understanding of this invention.

After completing the magnetization of the magnet elements in place, a bridge of high permeability material is placed across the exposed ends 24 of adjacent field pole members to provide a low reluctance path for the magnetic flux produced by the magnet elements 12. The magnetizing device 35 may then be readily removed from the bore of the stator and, since there is a complete magnetic circuit established, no demagnetization of the magnet elements occurs. The stator may then be further processed, stored and shipped if desired without any need for installation of the rotor therein. Also since the "keeper means" is disposed about the outer periphery of the stator the ends thereof are freely accessible. Moreover, the previous design limitations on axial machine length are avoided.

As shown particularly in FIGURE 2 the keeper means providing the low reluctance flux path may be conveniently provided by a keeper ring 37 comprising a number of arcuate segments 40 each of which is held against the outer periphery of the stator by the magnetic forces existing at the exposed ends 24 of the field pole members 11. To minimize the reluctance of the magnetic circuit including the magnet elements 12, pole core portions 20 and segments 40, the ends of the segments are preferably in direct contact with the exposed ends 24 so that the flux path between opposite poles of the same magnet element 12 does not contain any high reluctance air gaps.

To provide a convenient means of removing the keeper ring 37, each segment 40 thereof may be provided with a threaded bore into which a jack screw 42 may be inserted to force the segment away from the periphery of the stator so that it will be released. The use of a jack screw for such purpose is well known.

Alternatively, the magnetizing device may be arranged about the outer periphery of the stator so that the magnetizing means thereof is adjacent the exposed ends 24 of the field pole members as illustrated in phantom by device 50. After magnetizing the magnet elements 12 in place in the stator, a bridge of high permeability material is then provided between the pole face regions of adjacent field pole members or the rotor may be installed therein if desired.

The stator may be magnetized at will, therefore, either from the inside, with the keeper means placed on the outer periphery of the stator, or from the outside with the keeper means or the rotor placed on the inside, that is, within the bore of the stator.

From the foregoing description it will be apparent that the keeper ring 37 placed on the outer periphery of the stator does not in any way interfere with the further assembly of the machine or with its integration into the equipment it is to be associated with. For example, the brush rigging assembly may be readily attached to the end of the stator without disturbing the keeper ring 37. Also by being provided in segments the ring may be readily removed even though the machine may be integrated into equipment having the shaft of the rotor journaled or connected at both ends thereof. Moreover, since the keeper flux passes radially through the field pole members and into the keeper means the inherent limitation of the axial length of the stator imposed by arrangements requiring the keeper means to be placed at an axial end of the stator are completely avoided.

Although only certain preferred features of the invention have been described in the foregoing specification many modifications and changes will occur to those skilled in the art. Accordingly, by the appended claims it is intended to cover all such modifications and changes as fall within the true spirit and scope of the invention.

What I claim as new and desire to secure by Letters Patent of the United States is:

1. The method of making a stator for a dynamoelectric machine of the permanent magnet type comprising:
   (a) providing a plurality of field pole members of magnetic material each having a pole core portion and a pole shoe portion which terminates in a pole face region;
   (b) providing a like plurality of unmagnetized magnet elements;
   (c) arranging said field pole members and said magnet elements in alternate relationship to form therefrom a ring comprising an annular series of radially disposed, circumferentially spaced field pole members with the ends of said magnet elements in intimate contact with the pole core portion of adjacent field pole members and bridging the space therebetween;
   (d) rigidly securing the so arranged field pole members and magnet elements together through nonmagnetic material so that the outer periphery of the stator is defined by the exposed radially directed ends of the pole core portions of said field pole members and the bore thereof is defined by the opposite radially directed ends of said field pole member which terminates in exposed pole face regions of said pole shoe portion;
   (e) magnetizing said initially unmagnetized magnet elements in place in said stator assembly; and
   (f) establishing a temporary and removable low reluctance magnetic flux path between the accessible exposed radially directed ends of adjacent field pole members after magnetizing said initially unmagnetized magnet elements and retaining a temporary and removable low reluctance magnetic flux path to prevent demagnetization of the magnetized magnet elements when and after the equipment providing magnetization is removed.

2. The method of claim 1 wherein said magnetization of the magnet elements is accomplished by placing the equipment providing magnetization within the bore of said stator.

3. The method of claim 1 wherein said magnetization of the magnet elements is accomplished by placing the equipment providing magnetization about the outer periphery of said stator.

4. The method of making a stator for a dynamoelectric machine of the permanent magnet type comprising:
   (a) providing a plurality of field pole members of magnetic material each having a pole core portion and a pole shoe portion which terminates in a pole face region;
   (b) providing a like plurality of initially unmagnetized magnet elements;
   (c) clamping said field pole members and said magnet elements in alternate relationship between a pair of axially spaced circular rings of nonmagnetic material to form therefrom a ring comprising an annular series of radially disposed, circumferentially spaced field pole members with the ends of said magnet elements in intimate contact with the pole core portion of adjacent field pole members and bridging the space therebetween so that the outer periphery of the stator is defined by the exposed ends of the pole core portions of said field pole members and the bore of said stator is defined by the exposed pole face regions of said pole shoe portion;
   (d) filling at least the spaces defined between the exposed ends of said pole core portions and said magnet elements with a nonmagnetic material to bond said field pole members, said magnet elements and said circular rings into a rigid unitary assembly;
   (e) positioning a magnetizing device within the bore of said stator operative to magnetize said magnet elements;
   (f) bridging the pole core ends of adjacent field pole members with a high permeability material after magnetizing said initially unmagnetized magnet elements to provide a low reluctance magnetic flux path therebetween to prevent demagnetization of the magnetized magnet elements when said magnetizing device is removed from the bore of said stator; and
   (g) maintaining a temporary and removable low reluctance magnetic flux path until a rotor is installed within said stator.

5. The method of making a stator for a dynamoelectric machine of the permanet magnet type comprising:
   (a) providing a plurality of field pole members of magnetic material each having a pole core portion and a pole shoe portion which terminates in a pole face region;
   (b) providing a like plurality of initially unmagnetized magnet elements;
   (c) clamping said field pole members and said magnet elements in alternate relationship between a pair of axially spaced circular rings of nonmagnetic material to form therefrom a ring comprising an annular series of radially disposed, circumferetially spaced field pole members with the ends of said magnet elements in intimate contact with the pole core portion of adjacent field pole members and bridging the space therebetween so that the outer periphery of the stator is defined by the exposed ends of the pole core portions of said field pole members and the bore of said stator is defined by the exposed pole face regions of said pole shoe portion;
   (d) filling at least the spaces defined between the exposed ends of said pole core portions and said magnet elements with a nonmagnetic material to bond said field pole members, said magnet elements and said circular rings into a rigid unitary assembly;
   (e) positioning a magnetizing device about the outer periphery of said stator to magnetize said magnet elements;
   (f) bridging the exposed pole face regions of adjacent field pole members with a high permeability material after magnetizing said initially unmagnetized magnet elements to provide a low reluctance path therebetween to prevent demagnetization of the magnetized magnet elements when said magnetizing device is removed from the outer periphery of said stator; and
   (g) maintaining a temporary and removable low reluctance magnetic flux path until a rotor is installed within said stator.

6. The method of making a stator for a dynamoelectric machine of the permanent magnet type comprising:
   (a) providing a plurality of field pole members of magnetic material each having a pole core portion and a pole shoe portion which terminates in a pole face region;
(b) providing a like plurality of unmagnetized magnet elements;
(c) clamping said field pole members and said magnet elements in alternate relationship between a pair of axially spaced circular rings of nonmagnetic material to form therefrom a ring comprising an annular series of radially disposed, circumferentially spaced field pole members with ends of said magnet elements in intimate contact with the pole core portion of adjacent field pole members and bridging the space therebetween so that the outer periphery of the stator is defined by the ends of the pole core portions of said field pole members and the bore thereof is defined by the pole face region of said pole shoe portion;
(d) filling the spaces between the field pole members and the magnet elements with a thermosetting resinous material;
(e) curing said thermosetting resinous material to provide a dense mass of cured resinous material bonding said field pole members, said magnet elements and said circular rings into a rigid unitary assembly;
(f) positioning a magnetizing device within the bore of said stator operative to magnetize said magnet elements; and
(g) bridging the pole core ends of adjacent field pole members with a high permeability material after magnetizing said initially unmagnetized magnet elements and retaining a temporary and removable low reluctance magnetic flux path to provide a low reluctance magnetic path therebetween to prevent demagnetization of the magnetized magnet elements when and after said magnetizing device is removed from the bore of said stator.

7. The method of making a stator for a dynamoelectric machine of the permanent magnet type comprising:
(a) providing a plurality of field pole members of magnetic material each having a pole core portion and a pole shoe portion which terminates in a pole face region;
(b) providing a like plurality of unmagnetized magnet elements;
(c) clamping said field pole members and said magnet elements in alternate relationship between a pair of axially spaced circular rings of nonmagnetic material to form therefrom a ring comprising an annular series of radially disposed, circumferentially spaced field pole members with ends of said magnet elements in intimate contact with the pole core portion of adjacent field pole members and bridging the space therebetween so that the outer periphery of the stator is defined by the ends of the pole core portions of said field pole members and the bore thereof is defined by the pole face region of said pole shoe portion;
(d) filling the spaces between the field pole members and the magnet elements with a thermosetting resinous material;
(e) curing said thermosetting resinous material to provide a dense mass of cured resinous material bonding said field pole members, said magnet elements and said circular rings into a rigid unitary assembly;
(f) positioning a magnetizing device about the outer periphery of said stator to magnetize said magnet elements;
(g) bridging the exposed pole face regions of adjacent field pole members with a high permeability material after magnetizing said initially unmagnetized magnet elements to provide a low reluctance path therebetween to prevent demagnetization of the magnetized magnet elements when said magnetizing device is removed from the outer periphery of said stator; and
(h) maintaining a temporary and removable low reluctance magnetic flux path until a rotor is installed within said stator.

8. The method of making a magnetized stator for a dynamoelectric machine of the permanent magnet type comprising:
(a) providing a stator comprising an annular series of radially disposed, circumferentially spaced plurality of field pole members and a like plurality of unmagnetized magnet elements arranged in alternate relationship, with ends of said magnet elements in intimate contact with a pole core portion of adjacent field pole members and bridging the space therebetween, said field pole members and said magnet elements being secured together through nonmagnetic material so that the outer periphery of the stator is defined by exposed radially directed ends of the core portions of said field pole members and the bore of the stator is defined by the opposite radially directed ends of said field pole members which terminate in exposed pole face regions of said pole shoe portion;
(b) magnetizing said initially unmagnetized magnet elements in place in said stator assembly;
(c) establishing a temporary and removable low reluctance magnetic flux path between the accessible exposed radially directed ends of adjacent field pole members after magnetizing said initially unmagnetized magnet elements to prevent demagnetization of the magnetized magnet elements when the equipment providing magnetization is removed; and
(d) maintaining a temporary and removable low reluctance magnetic flux path until a rotor is installed within said stator.

References Cited

UNITED STATES PATENTS

| 2,048,161 | 7/1936 | Klaiber | 310—154 |
| 2,540,845 | 2/1951 | Thomas | 310—154 |
| 2,193,406 | 3/1940 | Goss et al. | 310—218 X |
| 2,993,134 | 6/1961 | Harvey | 310—218 X |
| 3,132,270 | 5/1964 | Phelon | 29—598 X |
| 3,249,780 | 5/1966 | Ibrahim et al. | 310—154 |

FOREIGN PATENTS

| 619,837 | 3/1949 | Great Britain. |
| 951,022 | 10/1956 | Germany. |

JOHN F. CAMPBELL, Primary Examiner

CARL E. HALL, Assistant Examiner

U.S. Cl. X.R.

310—42, 154, 256; 335—304